No. 646,970. Patented Apr. 10, 1900.
E. B. FRANCIS.
PROTECTIVE DEVICE FOR POLES.
(Application filed Nov. 22, 1899.)
(No Model.)
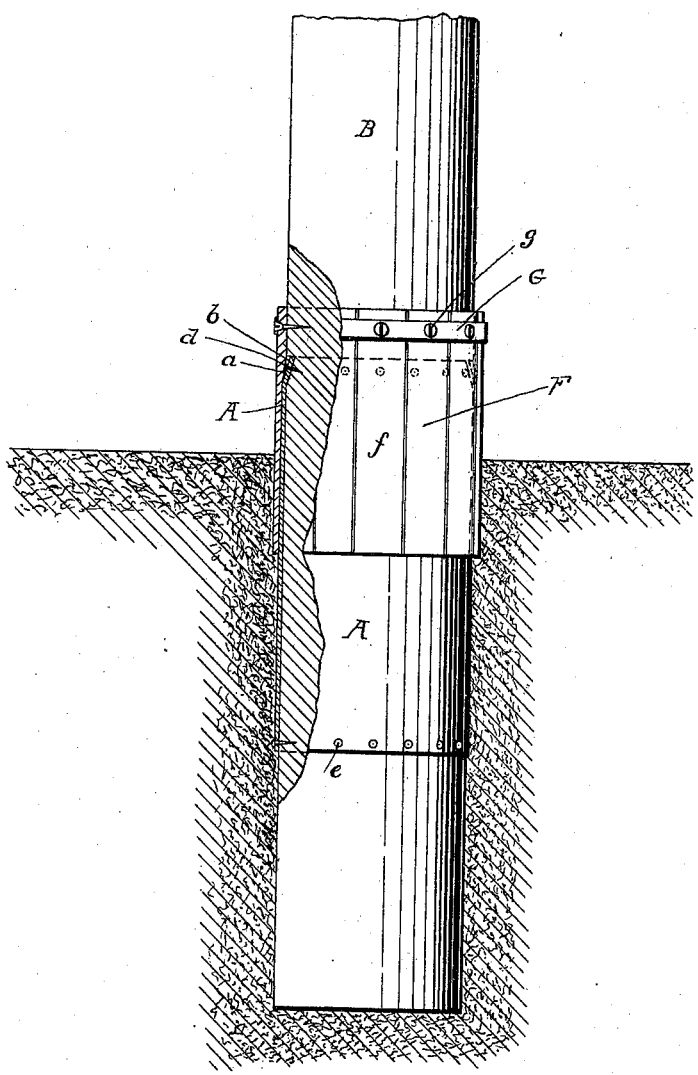
WITNESSES
INVENTOR
Edward B. Francis,
BY
Edgar Tate & Co.
ATTORNEYS

UNITED STATES PATENT OFFICE.

EDWARD BRADLEY FRANCIS, OF FALL RIVER, MASSACHUSETTS.

PROTECTIVE DEVICE FOR POLES.

SPECIFICATION forming part of Letters Patent No. 646,970, dated April 10, 1900.

Application filed November 22, 1899. Serial No. 737,871. (No model.)

*To all whom it may concern:*

Be it known that I, EDWARD BRADLEY FRANCIS, a citizen of the United States, residing at Fall River, in the county of Bristol and State of Massachusetts, have invented certain new and useful Improvements in Protective Devices for Poles, of which the following is a full and complete specification, such as will enable those skilled in the art to which it appertains to make and use the same.

This invention relates to means for protecting wooden poles, and it has particular relation to jacket devices which are applied at the base portion of various kinds of wooden poles (such as trolley-poles, electric-light or telegraph-wire poles, or the like) when the latter are set in the ground to keep the base dry and prevent rotting or decay.

The object of my invention is to provide a simple and improved jacket device of the above-stated class which will be simple and inexpensive and at the same time efficient and effective in operation and which will operate to retain in a perfectly-dry condition that particular portion of the base of wooden poles which exists a short distance below the top of the ground and above the same and which is most liable to rotting or decay.

The portion of a wooden pole, when set in the ground, which is liable to decay is usually that part which extends about one foot below the top of the ground and about three inches above the top of the ground. If this part of the pole can be kept perfectly dry and preserved against the ground moisture, which is the main source of rotting or decay, the ordinary life or service of the pole may be materially increased. It is the purpose of my present invention to so protect this portion of the pole that the whole surface of the same will be at all times in a perfectly-dry condition.

In the accompanying drawing, forming a part of this specification, in which like letters of reference denote corresponding parts, I have shown a side elevation, partly in section, showing the pole in position in the ground and having my improved protective device applied thereto.

Referring to the drawing, A designates a metallic jacket which surrounds the pole B and extends continuously upon the same some distance below the ground (represented at C) and some distance above the top surface of the ground. This jacket is preferably formed of non-corrosive metal, and it fits tightly against the surface or circumference of the pole, as shown. It preferably consists of a piece of sheet metal which is bent around the pole and has its meeting edges soldered together, its top edge being bent or turned inwardly, as at *a*, against the bottom wall of a circumferential groove or recess *b*, formed in the pole and preferably of semi-V shape in cross-section. At its top and bottom edges the jacket A is securely retained in connection with and in position upon the pole by a circumferential series of tacks or nails *d* and *e*, which are preferably either galvanized or of copper. In practice the jacket A preferably extends about six inches above the ground-line and about eighteen inches below the surface of the ground, which gives it a top and bottom portion beyond the area which is usually subject to the action of the ground moisture, said area normally extending not over three inches above the ground and about one foot below the ground.

The construction just above described with relation to the jacket and pole provides conveniently and inexpensively for the secure retention of such jacket upon the pole and the maintenance of a tight contact between the same. Any liability of displacement of the jacket is also effectually limited by means of the approximately-semi-V-shaped groove connection at the top edge of the jacket, which latter construction is also provided to enable a close fitting of a supplementary top exterior jacket, which will be hereinafter described.

In the ordinary practical application of the jacket A to the pole the piece of sheet metal may first be secured at its top edge in the groove *b* by means of the tacks *d*, and the bottom portion of the jacket can then be tightly turned around the surface of the pole and secured by the lower series of tacks *e* and have its meeting edges firmly soldered.

I provide a protection for the top portion of the non-corrosive protective jacket A, especially that part of the same which projects above the ground, (whereby I prevent any accidental puncturing of said jacket A in the exposed part above the ground by which the water-tight protection of the pole would be broken,) by means of a supplementary jacket F, which is preferably formed of hard pine or other wood and may be constructed of a series of vertical slats $f$, connected together at their top ends by means of a surrounding annular ring or band G and screws or fastening devices $g$, said slats having their meeting edges arranged in close juxtaposition and parallel alinement. The screws or fastening devices $g$ may pass from the supplementary jacket F into the pole B, and thus provide a means whereby said supplementary jacket is securely retained in connection with the pole. Said jacket F extends a short distance above the top of the main jacket A, and its lower portion preferably projects a short distance into the ground C. In the construction and arrangement as just above stated the supplementary jacket covers the top joint between the main jacket and the pole at the groove $b$, whereby a water-tight joint between said main jacket and the pole is further insured.

The operation and advantages of my invention will be readily understood. The device is exceedingly simple and inexpensive and can be readily and conveniently applied in operative position, and it will effectually serve to so protect that portion of the pole which is liable to the action of the moisture of the ground that rotting or decay of the pole at its base portion will be practically reduced to a minimum.

Having fully described my invention, I claim as new and desire to secure by Letters Patent—

1. As a protective means for poles of the class described, the combination, with the pole, of a protective jacket surrounding the same at its base portion and extending a short distance above and below the plane of the ground-line, and a supplementary jacket surrounding that portion of the main jacket which extends above the plane of the ground-line and extending above said first-named jacket, substantially as and for the purpose set forth.

2. As a protective means for poles of the class described, the combination, with the pole, of a protective jacket surrounding the same at its base portion and extending a short distance above and below the plane of the ground-line, the upper edge thereof being deflected into a recess formed in the pole, a supplementary jacket surrounding the exposed portion of the main jacket which projects above the plane of the ground-line, said supplementary jacket extending above the main jacket and the deflected portion thereof and independent means for securing said jacket to the pole, substantially as and for the purpose set forth.

In testimony that I claim the foregoing as my invention I have signed my name, in presence of the subscribing witnesses, this 18th day of November, 1899.

EDWARD BRADLEY FRANCIS.

Witnesses:
JAMES H. GLOVER,
JOHN R. MURRAY.